US009904065B2

(12) United States Patent
Jin et al.

(10) Patent No.: US 9,904,065 B2
(45) Date of Patent: Feb. 27, 2018

(54) REFRACTIVE LENS, DRIVING METHOD AND DISPLAY DEVICE

(71) Applicant: WuHan Tianma Micro-electronics Co., Ltd, Wuhan (CN)

(72) Inventors: Zengjian Jin, Wuhan (CN); Chao Dai, Wuhan (CN); Yu Zong, Wuhan (CN); Hongmin Zhang, Wuhan (CN); Hongkun Xiang, Wuhan (CN)

(73) Assignee: WUHAN TIANMA MICRO-ELECTRONICS CO., LTD., Wuhan (CN)

( * ) Notice: Subject to any disclaimer, the term of this patent is extended or adjusted under 35 U.S.C. 154(b) by 100 days.

(21) Appl. No.: 15/051,138

(22) Filed: Feb. 23, 2016

(65) Prior Publication Data
US 2017/0192243 A1 Jul. 6, 2017

(30) Foreign Application Priority Data
Dec. 31, 2015 (CN) .......................... 2015 1 1025807

(51) Int. Cl.
*G09G 5/00* (2006.01)
*G02B 27/22* (2018.01)
*G02F 1/133* (2006.01)
*H04N 13/02* (2006.01)

(52) U.S. Cl.
CPC ..... *G02B 27/2214* (2013.01); *G02F 1/13306* (2013.01); *H04N 13/0225* (2013.01)

(58) Field of Classification Search
CPC ............... G09G 3/003; G09G 3/36666; G02B 27/2214; G02F 1/13306

USPC ............. 345/1.3, 419, 421, 690, 697; 349/5; 385/16; 296/108
See application file for complete search history.

(56) References Cited

U.S. PATENT DOCUMENTS

| | | | | |
|---|---|---|---|---|
| 5,555,476 A | * | 9/1996 | Suzuki | G02B 3/005 349/110 |
| 7,863,579 B2 | * | 1/2011 | Suhami | G01T 3/06 250/390.11 |
| 9,264,697 B2 | * | 2/2016 | Huang | H04N 13/0404 |
| 2004/0240777 A1 | * | 12/2004 | Woodgate | G02B 27/2214 385/16 |
| 2005/0104801 A1 | * | 5/2005 | Sugiura | H01L 27/12 345/5 |

(Continued)

FOREIGN PATENT DOCUMENTS

| | | |
|---|---|---|
| CN | 1503308 A | 6/2004 |
| CN | 101344698 A | 1/2009 |

(Continued)

*Primary Examiner* — Prabodh M Dharia
(74) *Attorney, Agent, or Firm* — Anova Law Group, PLLC

(57) ABSTRACT

A refractive lens for displaying three-dimensional images (3D) comprises a first substrate, a second substrate, and a refractive layer configured between the first substrate and the second substrate and configured as a plurality of lens units of the refractive lens. The refractive lens is capable of being coupled to a first display panel having a pixel unit pitch A and a second display panel having a pixel unit pitch B to display the 3D images, the pixel unit pitch A being different from the pixel unit pitch B. Each lens unit of the refractive lens has an equal length p, and p is a common multiple of 2*A and 2*B. Each lens unit of the refractive lens is driven by a same driving voltage.

19 Claims, 6 Drawing Sheets

(56) References Cited

U.S. PATENT DOCUMENTS

| | | | |
|---|---|---|---|
| 2009/0015737 A1* | 1/2009 | Jung | G02B 27/2214 349/15 |
| 2009/0115783 A1* | 5/2009 | Eichenlaub | G02B 27/2221 345/421 |
| 2010/0073467 A1* | 3/2010 | Nam | G02B 27/2214 348/59 |
| 2011/0080723 A1* | 4/2011 | Kaluzhny | G03B 21/62 362/84 |
| 2012/0069255 A1* | 3/2012 | Takagi | G02B 3/14 349/15 |
| 2012/0194510 A1* | 8/2012 | Yun | G02B 3/06 345/419 |
| 2012/0249526 A1* | 10/2012 | Park | H04N 13/0007 345/419 |
| 2013/0127839 A1 | 5/2013 | Ki et al. | |
| 2013/0335463 A1* | 12/2013 | Chiang | H04N 13/0409 345/697 |
| 2014/0002758 A1 | 1/2014 | Huang et al. | |
| 2014/0043320 A1* | 2/2014 | Tosaya | G02B 27/0172 345/419 |
| 2014/0240303 A1* | 8/2014 | Chiang | G09G 3/003 345/212 |
| 2014/0375913 A1* | 12/2014 | Jen | G02B 27/2214 349/15 |
| 2015/0181206 A1* | 6/2015 | Kim | G02F 1/133603 345/690 |
| 2015/0241705 A1* | 8/2015 | Abovitz | G06K 9/00671 385/37 |
| 2016/0039362 A1* | 2/2016 | Hirai | B44F 1/06 296/1.08 |
| 2016/0109752 A1* | 4/2016 | Tateno | G02F 1/134336 349/5 |
| 2017/0097535 A1* | 4/2017 | Andou | G02F 1/133305 |
| 2017/0219824 A1* | 8/2017 | Kress | G02B 27/0101 |
| 2017/0237971 A1* | 8/2017 | Pitts | H04N 13/0282 345/419 |
| 2017/0353717 A1* | 12/2017 | Zhou | H04N 13/0497 |

FOREIGN PATENT DOCUMENTS

| | | |
|---|---|---|
| CN | 104252082 A | 12/2014 |
| CN | 104252083 A | 12/2014 |
| TW | 201403134 A | 1/2014 |
| WO | 2015091014 A1 | 6/2015 |

* cited by examiner

REFRACTIVE LENS, DRIVING METHOD AND DISPLAY DEVICE

CROSS-REFERENCES TO RELATED APPLICATIONS

This application claims the priority of Chinese Patent Application No. CN201511025807.1, filed on Dec. 31, 2015, the entire contents of which are incorporated herein by reference.

FIELD OF THE DISCLOSURE

The present disclosure generally relates to the display technologies and, more particularly, relates to a refractive lens, a driving method, and a display device.

BACKGROUND

With the recent development of display technology, three-dimensional (3D) display is attracting more and more attention. The 3D display makes displayed pictures become 3D and more vivid. The displayed images are no longer confined to the plane of the display screen, and are seemingly coming out of the display screen. Viewers can experience an immersive feeling with the 3D scenes.

Lenticular grating is a structure for achieving 3D display. Images captured from different viewing angles are recorded on a single picture in fringe patterns. A same lenticular grating structure is used to view the 3D images such that viewers see two different images of a same scene and perceive a depth due to the parallax between the two different images. Lenticular grating structure may be implemented through liquid crystals that refract lights passing through liquid crystals.

3D display effect can be achieved by incorporating lenticular grating into various display devices. For example, a lenticular grating may cover the display screen of a liquid crystal display panel to achieve 3D display effect.

A lenticular grating may be made of liquid crystal lenses which are formed by liquid crystals. Liquid crystals rotate to certain angles according to the input voltages applied to the liquid crystals such that light transmittance of liquid crystals is controlled. Liquid crystals are rotated and arranged periodically to form a cycle length or pitch. Display devices such as liquid crystal display panels have different resolutions. Liquid crystal lenses are required to form different pitches to accommodate display devices with different resolutions. In the current designs of liquid crystal lens parameters, the pitch of the 3D liquid crystal lenses is based on pixel designs of the liquid crystal display panels. Such pitch designs do not adapt to display devices with different pixel resolutions and may have compatibility issues.

The disclosed refractive lens, driving method and display device are directed to solve one or more problems in the art.

BRIEF SUMMARY OF THE DISCLOSURE

Directed to solve one or more problems set forth above and other problems in the art, the present disclosure provides a refractive lens, a driving method and a display device.

One aspect of the present disclosure includes a refractive lens for displaying 3D images and capable of being coupled to a plurality of display panels having different pixel unit pitches, including at least a first display panel having a pixel unit pitch A and a second display panel having a pixel unit pitch B. The refractive lens includes a first substrate, a second substrate, and a refractive layer configured between the first substrate and the second substrate and configured as a plurality of lens units based on the different pixel unit pitches. Each lens unit has equal length of a common multiple of at least 2A and 2B. Each lens unit is driven by same driving voltages.

Another aspect of the present disclosure includes a method for driving the refractive lens to display 3D images. The method includes the following steps. A plurality of display panels with different resolutions is provided, including at least a first display panel with X1 number of pixels and a pixel unit pitch A in a horizontal direction, and a second display panel with X2 number of pixels and a pixel unit pitch B in a horizontal direction. A number of driving voltage terminals for each lens unit of the refractive lens is calculated based on X1 and X2, and a desired length of a single lens unit is calculated corresponding to a common multiple of 2A and 2B. The refractive lens is divided into a plurality of lens units of the desired length, the calculated number of driving voltage terminals are connected to each lens unit, and the Yth driving voltage terminals of each lens unit are connected together. The refractive lens is driven by the calculated number of driving voltages in the cycle of 2N*A when coupled with the first display panel or in the cycle of 2N*B when coupled with the second display panel.

Another aspect of the present disclosure includes a display device. The display device includes the disclosed refractive lens.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the present invention.

Figure 1:
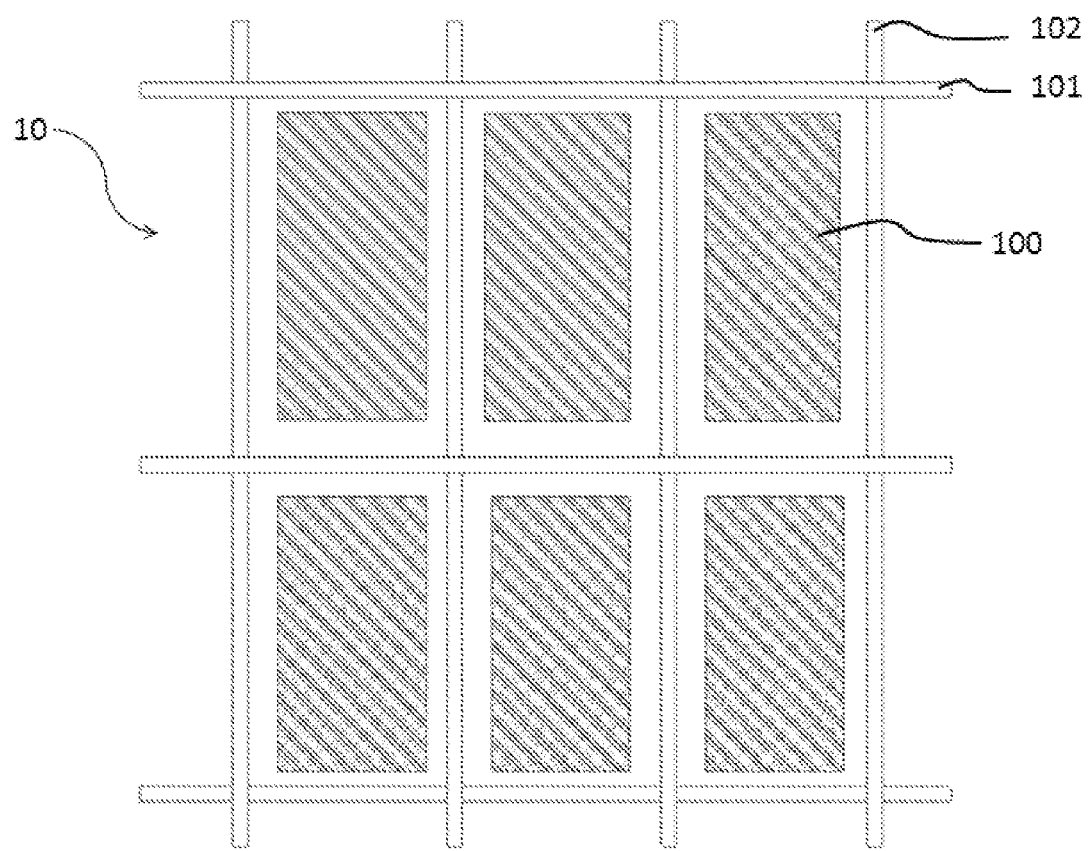
FIG. 1 illustrates a top view of an exemplary display panel according to the disclosed embodiments.

FIG. 1 illustrates a top view of an exemplary display panel according to the present disclosure. Referring to FIG. 1, the display panel 10 may include data lines 102, gate electrode lines 101 intersecting with the data lines 102, and a plurality of pixel units 100 enclosed by the intersecting data lines 101 and gate electrode lines 102. The plurality of the pixel units 100 may be configured on the substrate to display images.

The display panel 10 may be a liquid crystal display panel. The liquid crystal display panel may include an upper substrate and a lower substrate (not shown). The upper substrate and the lower substrate may be separated by a gap. The gap between the upper substrate and the lower substrate may be filled with liquid crystals. When driven by a voltage, the liquid crystals may rotate and change the light transmittance to display different images. Viewers may see the two dimensional images on the liquid crystal display panel.

Figure 2:
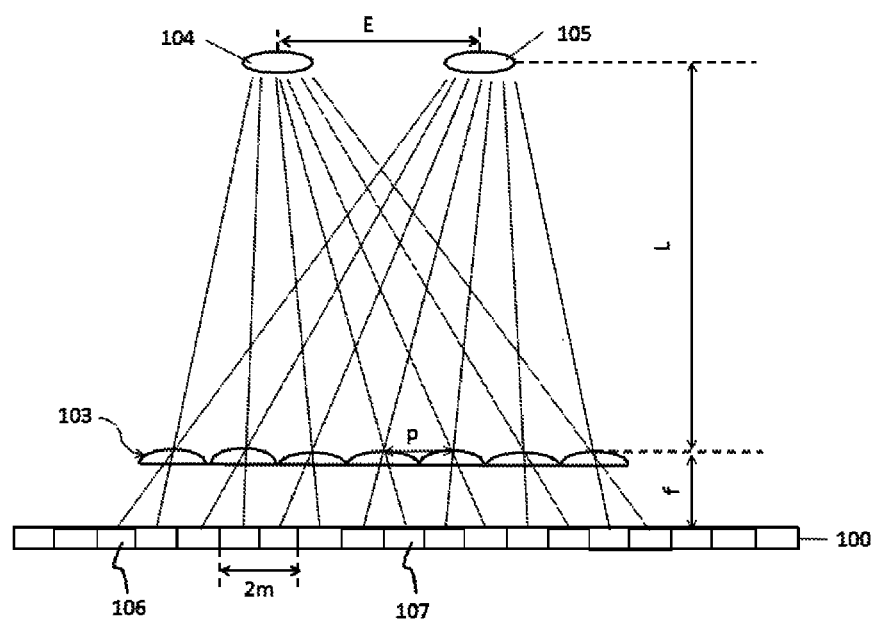
FIG. 2 illustrates a schematic view of an exemplary refractive lens coupled with an exemplary display panel according to the disclosed embodiments.

FIG. 2 illustrates a schematic view of an exemplary refractive lens coupled with an exemplary display panel according to the present disclosure. Referring to FIG. 2, the refractive lens 103 may include a first substrate and a second substrate (not shown). A refractive layer may be configured between the first substrate and the second substrate to form the refractive lens 103. The refractive lens 103 may be configured on the top of the display panel. The refractive lens 103 may refract light to present an image displayed by certain pixel units 100 to viewer's left eye and another image displayed by certain other pixel units 100 to viewer's right eye. Left eye images and right eye images may be different. The parallax between the left eye images and the right eye images may produce the three dimensional effect. Thus, the three dimensional display may be achieved.

Specifically, the pixel units 100 may be divided into right eye pixel units 106 and left eye pixel units 107. The light emitted from the right eye pixel units 106 may be seen by viewer's right eye 105, and the light emitted from the left eye pixel units 107 may be seen by viewer's left eye 104. The distance between the left eye 104 and the right eye 105 is E. The distance between adjacent pixel units is m. That is, the pixel unit pitch is m. The refractive lens 103 may include a plurality of refractive lens units. The distance between adjacent refractive lens units is p. The focal length of the refractive lens 103 is f. The desired distance between viewer's eyes and the refractive lens units is L. That is, the desired 3D viewing distance by the viewer is L. The mathematical relationships between these parameters are shown as follows.

$$p = \frac{E}{E+m} \times 2m;$$

$$f = \frac{p^2}{8\Delta nd}; \text{ and}$$

$$L = \frac{E}{m} \times f,$$

wherein $\Delta n$ is the difference between the refractive index of the refractive lens and the refractive index of air, and d is the distance between the upper substrate and the lower substrate of the display panel.

Because the distance E between the left eye 104 and the right eye 105 is substantially greater than the distance m between adjacent pixel units, the distance p between adjacent refractive lens units may be approximately equal to 2×m. Display panels with different resolutions may have different pixel unit pitches m. The corresponding distances p between adjacent refractive lens units for 3D displaying may be different. Thus, liquid crystal display panels with different resolutions may need different refractive lenses, causing high cost of display panels.

Figure 3:
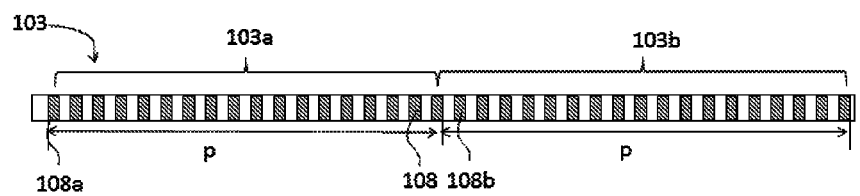
FIG. 3 illustrates a schematic view of another exemplary refractive lens according to the disclosed embodiments.

FIG. 3 illustrates a schematic view of another exemplary refractive lens according to the present disclosure. Referring to FIG. 3, the refractive lens 103 may include a lens unit 103a and a lens unit 103b, and the lens unit 103a and lens unit 103b may have same length and same driving voltage. The refractive lens 103 may be configured to be used with a first display panel and a second display panel. The first display panel may have a distance A between adjacent pixel units. The second display panel may have a distance B between adjacent pixel units. According to the equations described above, the distance p1 between adjacent refractive lens units corresponding to the first display panel may be approximately equal to 2A, and the distance p2 between adjacent refractive lens units corresponding to the second display panel may be approximately equal to 2B.

In one embodiment, the length of refractive lens units, i.e., the distance p between adjacent refractive lens units may be set to a common multiple of 2A and 2B. That is, the distance p between adjacent refractive lens units may be set to a common multiple of the distance p1 between adjacent refractive lens units corresponding to the first display panel and the distance p2 between adjacent refractive lens units corresponding to the second display panel.

In one embodiment, the refractive lens 103 may be a liquid crystal lens. The refractive layer of the refractive lens may be made of liquid crystals.

Figure 4:
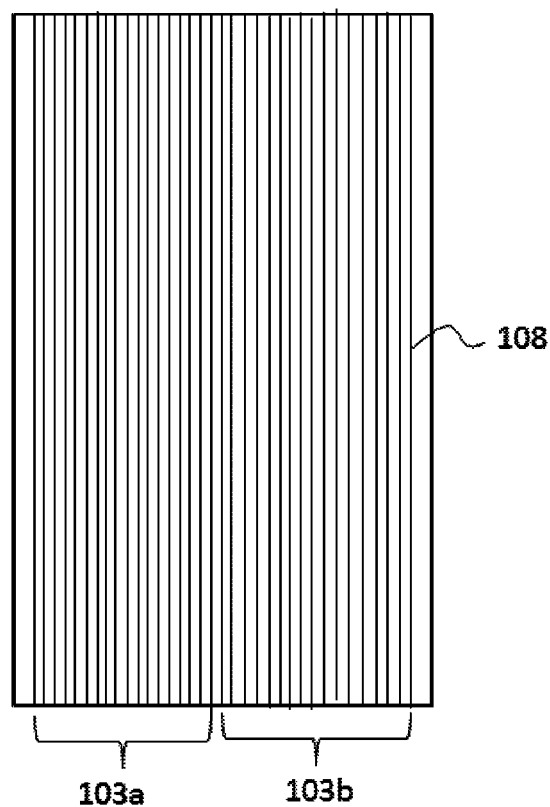
FIG. 4 illustrates a top view of an exemplary refractive lens according to the disclosed embodiments.

FIG. 4 illustrates a top view of an exemplary refractive lens according to the present disclosure. Referring to FIG. 4, each refractive lens unit may have a plurality of voltage input terminals 108. In one embodiment, two voltages may be configured to drive the liquid crystal lenses. The two voltages may be a common voltage (COM) and a segment voltage (SEG). The common voltage may be constantly applied to all lens units. The segment voltage may vary periodically with the connected lens units. For example, the lens unit 103a may be driven by one cycle of segment voltage and the lens unit 103b may be driven by next cycle of segment voltage. In both cycles, the segment voltages may be equal. The difference between the segment voltage and the common voltage may determine the rotation angle of the liquid crystals. The different rotation angles of the liquid crystals may have different effects on the passing light. Thus, liquid crystals may form lenses.

In certain embodiment, |SEG−COM|=10V. Each liquid crystal lens unit may have X number of voltage input terminals, wherein X is an integer and X≥1. The Yth voltage input terminal of each liquid crystal lens unit may be electrically connected to each other, wherein Y is an integer, Y≥1 and X≥Y. With such arrangement, only one set of input voltages may be sufficient to drive a plurality of electrically connected refractive lens units such that complicated driving circuits and circuit overloads may be avoided.

Figure 5:
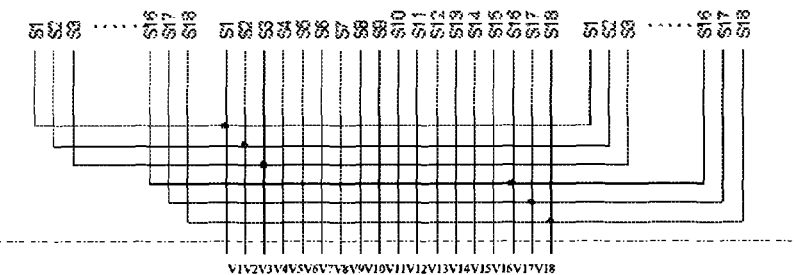
FIG. 5 illustrates a schematic view of the wiring of an exemplary refractive lens according to the disclosed embodiments.

FIG. 5 illustrates a schematic view of the wiring of an exemplary refractive lens according to the present disclosure. Referring to FIG. 5, each liquid crystal lens unit may have 18 voltage input terminals, i.e., X=18. In one embodiment, three groups of liquid crystal lens units may be shown in FIG. 5. Other number of voltage input terminals and/or groups of liquid crystal lens units may also be used.

Each group of liquid crystal lens units may have 18 voltage input terminals that are labeled from S1 through S18 corresponding to voltages V1 through V18. The voltage input terminals S1 corresponding to the input voltage V1 in each group may be electrically connected to one another. The voltage input terminals S2 corresponding to the input voltage V2 in each group may be electrically connected to one another. Similarly, the voltage input terminals $S_Y$ corresponding to the Yth voltage input terminal in each group may be electrically connected to one another. The wiring may be connected to a flexible printed circuit (FPC) board that supplies voltage signals to the liquid crystal lens units.

Figure 6:
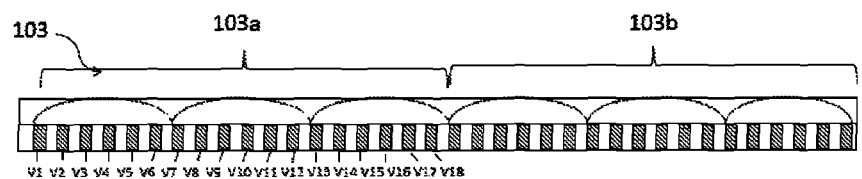
FIG. 6 illustrates a schematic view of another exemplary refractive lens according to the disclosed embodiments.

Further, the liquid crystal lenses may also include a controller (not shown) and other circuitry for operation of the lens units. The controller may control the voltages that drive the liquid crystal lens units through a driving circuit (not shown). The liquid crystal lens units may be divided into M number of liquid crystal lens sub-units that have same driving voltages and same lengths. The length of the lens sub-units may be a positive integer multiple of 2A or 2B. FIG. 6 illustrates a schematic view of another exemplary refractive lens according to the present disclosure.

Referring to FIG. 6, in one embodiment, the lens unit 103a and the lens unit 103b may have 18 voltage input terminals, respectively. The input voltages of these terminals may be V1 through V18. The driving voltages may be configured to the following.

V1=V7=V13;
V2=V8=V14;
V3=V9=V15;
V4=V10=V16;
V5=V11=V17; and
V6=V12=V18.

At this time, the lens unit 103a may be divided into three lens sub-units. Each lens sub-unit may correspond to a voltage cycle. The lens unit 103b may have the driving method same as that of the lens unit 103a. Originally, the liquid crystal lenses may have only two driving voltage cycles for the lens unit 103a and the lens unit 103b. After the driving method is changed, the liquid crystal lenses may have six driving voltage cycles. The pitch of each driving voltage cycle may be reduced to one third of the original pitch.

Figure 7:
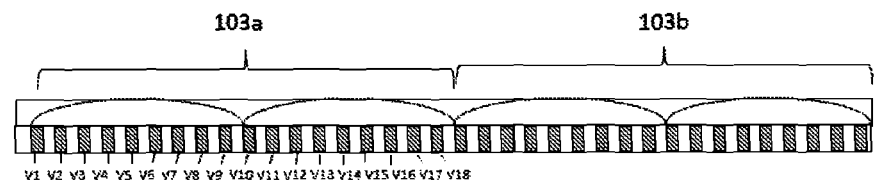
FIG. 7 illustrates a schematic view of another exemplary refractive lens according to the disclosed embodiments.

FIG. 7 illustrates a schematic view of another exemplary refractive lens according to the present disclosure. Referring to FIG. 7, in one embodiment, the lens unit 103a and the lens unit 103b may have 18 voltage input terminals, respectively. The input voltages of these terminals may be V1 through V18. The driving voltages may be configured to the following.

V1=V10;
V2=V11;
V3=V12;
V4=V13;
V5=V14;
V6=V15;
V7=V16;
V8=V17; and
V9=V18.

At this time, the lens unit 103a may be divided into two lens sub-units. Each lens sub-unit may correspond to a voltage cycle. The lens unit 103b may have the driving method same as that of the lens unit 103a. Originally, the liquid crystal lenses may have only two driving voltage cycles for the lens unit 103a and the lens unit 103b. After the driving method is changed, the liquid crystal lenses may have four driving voltage cycles. The pitch of each driving voltage cycle may be reduced to one half of the original pitch.

The examples described above indicate the pitch of the liquid crystal lenses may vary with the driving voltage cycles to adapt to liquid crystal display panels with different resolutions. The variation of the liquid crystal lens pitches may not be limited to the two examples described above. As long as the number of the voltage input terminals is evenly divided, the lens units may be further divided into the corresponding number of lens sub-units.

In one embodiment, each lens unit may have X number of driving voltage terminals. C may be a common multiple of A and B. Then, $X=N\times(A\times B)/C^2$, wherein N is a positive integer. In such arrangement, the liquid crystal lenses may be used with the first display panel and the second display panel. Optionally, N=1, and A and B may be the distance between adjacent rows of pixel units or the distance between adjacent columns of pixel units. In one embodiment, A and B may be the distance between adjacent rows of pixel units.

In one embodiment, for example, the first display panel may be a 5.5 inch HD display panel with a resolution of about 720 μm*1280 and a pixel unit pitch of about 189 μm. The second display panel may be a 5.5 inch FHD display panel with a resolution of about 1080 μm*1920 and a pixel unit pitch of about 126 μm. The length p of the lens unit may be configured to two times the common multiple of the pixel unit pitch of the first display panel and the pixel unit pitch of the second display panel, which is 756 μm.

Further, each lens unit may include at least 6 voltage input terminals. When the liquid crystal lenses are configured with the first display panel, the voltage driving method described above may be used. Each liquid crystal lens unit may be divided into two lens sub-units. Each lens sub-unit may have a length of about 378 μm, which is two times the pixel unit pitch of the first display panel. Thus, the liquid crystal lenses may be suitable for the first display panel to display 3D images.

When the liquid crystal lenses are configured with the second display panel, the voltage driving method described above may be used. Each liquid crystal lens unit may be divided into three lens sub-units. Each lens sub-unit may have a length of about 252 μm, which is two times the pixel unit pitch of the second display panel. Thus, the liquid crystal lenses may be suitable for the second display panel to display 3D images.

By adjusting the cycle of the driving voltages, the pixel unit pitch p of the liquid crystal lenses may be adjusted to make the same liquid crystal lenses to be configured with the first display panel and the second display panel. Thus, the problem that display panels with different resolutions require making liquid crystal lenses with different lens unit pitches may be resolved.

In one embodiment, the length p of the lens unit may be two times the common multiple of the pixel unit pitch of the first display panel and the pixel unit pitch of the second display panel. By adjusting the driving voltages, the lens unit may be divided to adapt to the first display panel and the second display panel. In other embodiments, the length p of the lens unit may be a positive integer multiple of about 756 μm, and the number of voltage input terminals in each lens unit may be a positive integer multiple of 6.

Figure 10:
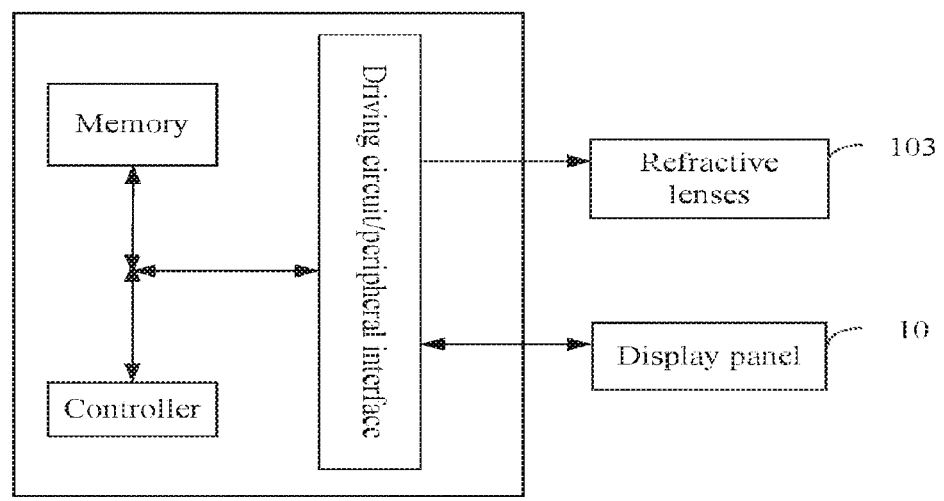
FIG. 10 illustrates a schematic view of an exemplary display device structure according to the disclosed embodiments.

FIG. 10 illustrates a schematic view of an exemplary display device structure according to the present disclosure. Referring to FIG. 10, the display device may include a display panel 10, a refractive lens 103, a controller, a memory, and a driving circuit/peripheral interface.

In one embodiment, the controller may detect the display resolution of the display panel 10 through the peripheral interface. In another embodiment, the controller may retrieve the display resolution of the display panel from the memory. The display resolution of the display panel may be configured in the memory at the time of manufacturing.

Based on the display panel resolution, the controller may calculate the desired length of the lens units. Based on refractive lens 103 parameters such as the number of voltages terminals, the controller may calculate the driving voltage configuration corresponding to the desired length of the lens units. The controller may configure the driving circuit to supply the driving voltages to the voltage terminals of the refractive lens 103 to form a plurality of lens units with the same driving voltage and the same desired length. Thus, the refractive lens driven by the driving voltages configured by the controller may be coupled with the display panel to display three dimensional images.

The procedure described above may adapt the refractive lens 103 to a plurality of display panel with different display resolutions. In certain embodiments, the controller, the memory, and the driving circuit/peripheral interface as shown in FIG. 10 may not be dedicated to the refractive lens 103. The functions of the controller, the memory, and the driving circuit/peripheral interface described above may be implemented by the hardware and/or software resources commonly shared with other parts of the display device.

Table 1 lists a plurality of display panels with different resolutions provided by the present disclosure. Assuming the first display panel has n number of pixels. Then, the second display panel has 4n/3 number of pixels. The third display panel has 2n number of pixels. The fourth display panel has 8n/3 number of pixels. When the dimensions of display panels remain the same, the pixel size is inversely proportional to the number of pixels, i.e., the reciprocal of the number of pixels. For the liquid crystal lenses corresponding to the display panels, each lens unit may include 8N, 6N, 4N, and 3N number of driving voltage terminals, respectively, wherein N is a positive integer. Each liquid crystal lens may include $3*8*N$ (or 24N) total number of driving voltage terminals, wherein N is a positive integer.

TABLE 1

| Sequence number | Resolution | Number of pixels | Pixel size | Number of driving voltage terminals | Total number of driving voltage terminals |
|---|---|---|---|---|---|
| 1 | 540*960 | n | 8n/3 | 8N | 3*8*N |
| 2 | 720*1280 | 4n/3 | 2n | 6N | |
| 3 | 1080*1920 | 2n | 4n/3 | 4N | |
| 4 | 1440*2560 | 8n/3 | n | 3N | |

The number of driving voltage terminals included in each lens unit may be determined in the following method. The display panel resolution may be the product of the number of pixels in the horizontal direction and the number of pixels in the vertical direction, represented as $X_n*Y_n$. In one embodiment, the number of pixels in the horizontal direction is $X_n$. Accordingly, the first display panel has X1 number of pixels. The second display panel has X2 number of pixels. The third display panel has X3 number of pixels. The fourth display panel has X4 number of pixels.

Assuming (X1, X2, X3, ..., Xn) is defined as the greatest common divisor of X1, X2, X3, ..., Xn and [Z1, Z2, Z3, ..., Zn] is defined as the least common multiple of Z1, Z2, Z3, ..., Zn, then Z1=X1/(X1, X2, X3, ..., Xn), Z2=X2/(X1, X2, X3, ..., Xn), Z3=X3/(X1, X2, X3, ..., Xn), and Zn=Xn/(X1, X2, X3, ..., Xn). For the liquid crystal lenses corresponding to display panels with different resolutions, the number of driving voltage terminals required in each lens unit is [Z1, Z2, Z3, ..., Zn]/Z1, [Z1, Z2, Z3, ..., Zn]/Z2, [Z1, Z2, Z3, ..., Zn]/Z3, or [Z1, Z2, Z3, ..., Zn]/Zn.

Assuming that the first display panel has X1 number of pixels in the horizontal direction, the second display panel has X2 number of pixels in the horizontal direction, and C is the greatest common divisor of X1 and X2, Z1=X1/C, Z2=X2/C. Assuming D is least common multiple of Z1 and Z2, X=D/Z1 or X=D/Z2.

The number of driving voltage terminals in each lens unit may be determined by the number of pixels in the horizontal direction or the number of pixels in the vertical direction. In one embodiment, the number of pixels in the horizontal direction may be used because the number of pixels in the horizontal direction may have more substantial impact on the liquid crystal lenses.

Figure 8:
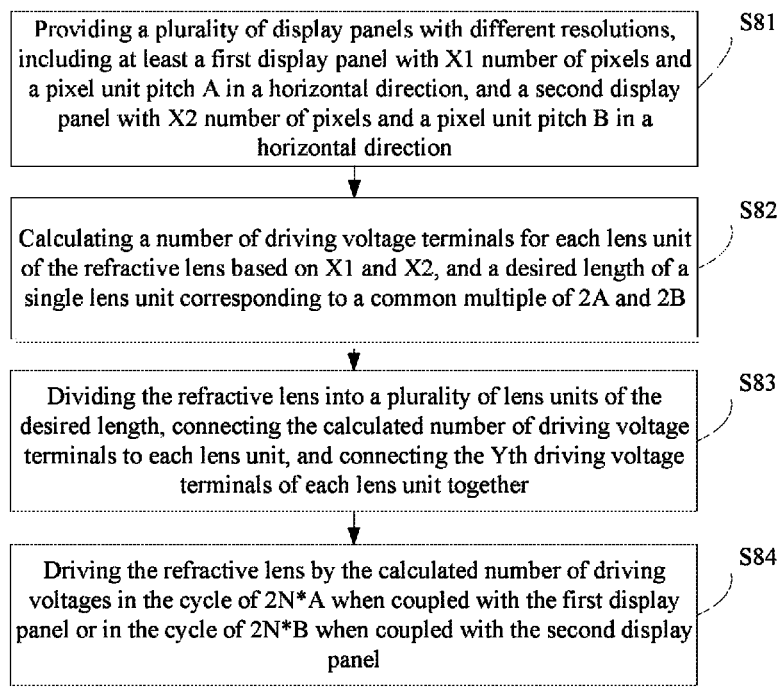
FIG. 8 illustrates a flow chart of an exemplary method for driving the refractive lens according to the disclosed embodiments.

The present disclosure also provides a method for driving the refractive lens for 3D displaying. FIG. 8 illustrates a flow chart of an exemplary method for driving the refractive lens according to the present disclosure. Referring to FIG. 8, the driving method may include the following steps.

Step S81: provide a first display panel with X1 number of pixels and a pixel unit pitch A in a horizontal direction, and a second display panel with X2 number of pixels and a pixel unit pitch B in a horizontal direction.

Specifically, two display panels are used for the illustrative purpose. More display panels with different resolutions may be coupled with the commonly shared refractive lens. In one embodiment, the number of pixels and the pixel unit pitch in a horizontal direction may be used. In another embodiment, the number of pixels and the pixel unit pitch in a vertical direction may be used.

Step S82: calculate a number of driving voltage terminals for each lens unit of the refractive lens based on X1 and X2, and a desired length of a single lens unit corresponding to a common multiple of 2A and 2B.

Specifically, the number of driving voltage terminals connected to each lens unit may be calculated as described previously. The length of each lens unit may be calculated as a common multiple of 2A and 2B. The driving voltages from the driving voltage terminals may form a plurality of lens sub-units in each lens unit.

Step S83: divide the refractive lens into a plurality of lens units of the desired length, connect the calculated number of driving voltage terminals to each lens unit, and connect the Yth driving voltage terminals of each lens unit together. Y is an integer greater than 1 and equal to or less than the calculated number of driving voltage terminals.

Specifically, each lens unit is connected with the calculated number of driving voltage terminals. Because the Yth driving voltage terminal in each set are connected to one another, only one set of driving voltages may be supplied to drive all lens units.

Step S84: drive the refractive lens by the calculated number of driving voltages in the cycle of 2N*A when coupled with the first display panel or in the cycle of 2N*B when coupled with the second display panel. N is a positive integer.

Specifically, in one embodiment, N=1. When N=1, each driving voltage cycle may correspond to a lens unit cycle. The cyclic structure of lens units may be fully utilized. In certain embodiments, each lens unit may include a plurality of lens sub-units. The number of driving voltage terminals included in each lens sub-unit may be equal to or greater than 3. When the number of driving voltage terminals included in each lens sub-unit is less than 3, an integer greater than 1 may be used as the multiplier to increase the number of driving voltage terminals in each lens sub-unit.

Figure 9:
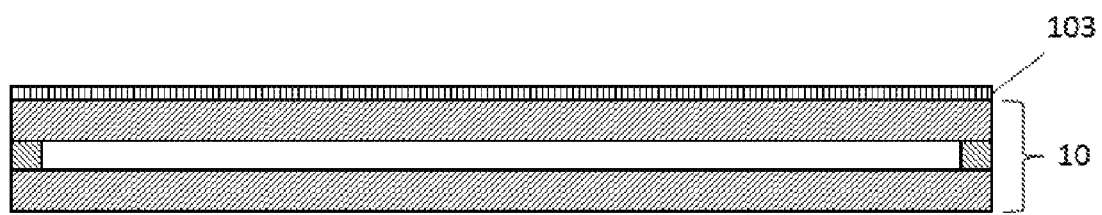
FIG. 9 illustrates a schematic view of an exemplary display device according to the disclosed embodiments.

The present disclosure also provides a display device. The display device may include a refractive lens and a liquid crystal display panel. FIG. 9 illustrates a schematic view of an exemplary display device according to the present disclosure. Referring to FIG. 9, the refractive lens 103 may be configured on the top of display panel 10.

Various embodiments have been described to illustrate the operation principles and exemplary implementations. The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. A refractive lens for displaying three-dimensional (3D) images comprising:
   a first substrate;
   a second substrate; and
   a refractive layer configured between the first substrate and the second substrate and configured as a plurality of lens units of the refractive lens,
   wherein:
   the refractive lens is capable of being coupled to a first display panel having a pixel unit pitch A and a second display panel having a pixel unit pitch B to display the 3D images, the pixel unit pitch A being different from the pixel unit pitch B;
   each lens unit of the refractive lens has an equal length p, wherein p is a common multiple of 2*A and 2*B; and
   each lens unit of the refractive lens is driven by a same driving voltage.

2. The refractive lens of claim 1, wherein the refractive layer is made of liquid crystals.

3. The refractive lens of claim 1, further including a controller configured to control the driving voltages of the lens units, wherein:
   the lens unit is divided into M number of lens sub-units;
   each lens sub-unit has an equal length of a positive integer multiple of 2*A or a positive integer multiple of 2*B; and
   each lens sub-unit is driven by a same driving voltage.

4. The refractive lens of claim 3, wherein the driving voltage includes a common voltage and a segment voltage.

5. The refractive lens of claim 4, wherein the absolute difference between the common voltage and the segment voltage is approximately 10V.

6. The refractive lens of claim 1, wherein:
   each lens unit has X number of driving voltage terminals, wherein X is an integer equal to or greater than 1; and
   a Yth driving voltage terminal of each lens unit is electrically connected to one another, wherein Y is an integer equal to or greater than 1 and X≥Y.

7. The refractive lens of claim 6, wherein:
   the first display panel has X1 number of pixels in a horizontal direction;
   the second display panel has X2 number of pixels in the horizontal direction;
   C is a greatest common divisor of X1 and X2;
   a first number Z1=X1/C;
   a second number Z2=X2/C;
   number D is a least common multiple of Z1 and Z2; and
   the number of driving voltage terminals in each lens unit is X=D/Z1 or X=D/Z2.

8. The refractive lens of claim 6, wherein:
   C is a greatest common divisor of A and B;
   N is a positive integer; and
   $X=N*(A*B)/C^2$.

9. A method for driving a refractive lens to display three-dimensional (3D) images, comprising:
   providing a first display panel with a pixel unit pitch A, and a second display panel with a pixel unit pitch B, the pixel unit pitch A being different from the pixel unit pitch B;
   configuring the refractive lens into a plurality of lens units, wherein each lens unit of the refractive lens has an equal length p, p is a common multiple of 2*A and 2*B, and each lens unit of the refractive lens is driven by a same driving voltage; and
   driving the refractive lens at a driving voltage having a cycle of 2N*A when the refractive lens is coupled with the first display panel, and at a driving voltage having a cycle of 2N*B when the refractive lens is coupled with the second display panel, wherein N is a positive integer.

10. The driving method of claim 9, wherein N=1.

11. The driving method of claim 9, further including a controller configured to control the driving voltages of the lens units, wherein:
   the lens unit is divided into M number of lens sub-units;
   each lens sub-unit has an equal length of a positive integer multiple of 2*A or 2*B; and
   each lens sub-unit is driven by a same driving voltage.

12. The driving method of claim 11, wherein the driving voltage includes a common voltage and a segment voltage.

13. The driving method of claim 12, wherein an absolute difference between the common voltage and the segment voltage is approximately 10V.

14. The driving method of claim 9, wherein:
   each lens unit has X number of driving voltage terminals, wherein X is an integer equal to or greater than 1; and
   a Yth driving voltage terminal of each lens unit is electrically connected to one another, wherein Y is an integer equal to or greater than 1and X≥Y.

15. The driving method of claim 14, wherein:
   the first display panel has X1 number of pixels in a horizontal direction;
   the second display panel has X2 number of pixels in the horizontal direction;
   C is a greatest common divisor of X1 and X2;
   a first number Z1=X1/C;
   a second number Z2=X2/C;
   number D is a least common multiple of Z1 and Z2; and
   the number of driving voltage terminals in each lens unit is X=D/Z1 or X=D/Z2.

16. The driving method of claim 14, wherein:
   C is a greatest common divisor of A and B;
   and
   $X=N*(A*B)/C^2$.

17. A display device, comprising:
   a refractive lens for displaying three-dimensional (3D) images,
   wherein the refractive lens comprises:
   a first substrate;
   a second substrate; and
   a refractive layer configured between the first substrate and the second substrate and configured as a plurality of lens units of the refractive lens, wherein:
the refractive lens is capable of being coupled to a first display panel having a pixel unit pitch A and a second display panel having a pixel unit pitch B to display the 3D images, the pixel unit pitch A being different from the pixel unit pitch B;
each lens unit of the refractive lens has an equal length p, wherein p is a common multiple of 2*A and 2*B; and
each lens unit of the refractive lens is driven by a same driving voltage.

18. The display device of claim 17, further including a controller configured to control the driving voltages of the lens units, wherein:
the lens unit is divided into M number of lens sub-units;
each lens sub-unit has an equal length of a positive integer multiple of 2*A or a positive integer multiple of 2*B; and
each lens sub-unit is driven by a same driving voltage.

19. The display device of claim 17, wherein:
each lens unit has X number of driving voltage terminals, wherein X is an integer equal to or greater than 1; and
a Yth driving voltage terminal of each lens unit is electrically connected to one another, wherein Y is an integer equal to or greater than 1 and X≥Y.

\* \* \* \* \*